United States Patent
Wang et al.

(10) Patent No.: US 8,293,325 B2
(45) Date of Patent: Oct. 23, 2012

(54) POLYMER INJECTION METHOD FOR BLOCKING PIPING IN DIKES AND DAMS

(75) Inventors: Fuming Wang, Zhengzhou (CN); Jianwu Wang, Zhengzhou (CN); Mingsheng Shi, Zhengzhou (CN); Yingchun Cai, Zhengzhou (CN); Qiang Li, Zhengzhou (CN); Xiaoliang Wang, Zhengzhou (CN)

(73) Assignee: Zhengzhou Uretek Technology Ltd., Zhengzhou, Henan Province (CN)

( * ) Notice: Subject to any disclaimer, the term of this patent is extended or adjusted under 35 U.S.C. 154(b) by 299 days.

(21) Appl. No.: 12/721,342

(22) Filed: Mar. 10, 2010

(65) Prior Publication Data

US 2011/0104372 A1    May 5, 2011

(30) Foreign Application Priority Data

Nov. 2, 2009   (CN) .......................... 2009 1 0066332

(51) Int. Cl.
   *B05D 7/22*    (2006.01)
   *B05D 1/02*    (2006.01)
   *E02B 3/10*    (2006.01)
(52) U.S. Cl. ........................ 427/236; 427/243
(58) Field of Classification Search .............. 427/236, 427/239, 243, 247; 239/276, 302–308, 310, 239/418–419.5, 525, 532; 118/306, 317, 118/323
See application file for complete search history.

(56) References Cited

U.S. PATENT DOCUMENTS 3,425,455 A * 2/1969 Bauer et al. ................. 138/143

FOREIGN PATENT DOCUMENTS

NL    7414214 A    *    5/1976

OTHER PUBLICATIONS

Derwent abstract for NL 7414214 A (1976).*
Fuss & O'Neil, Inc, "Guidelines for Inspection and Maintenance of Dams," Connecticut Department of Environmental Protection, Bureau of Water Management, Inland Water Resources Division, Sep. 2001, 46 pages.*
Stéphane et al., "The scaling law of piping erosion," 18ème Congrès Français de Mécanique, Grenoble, 27-31 août Aug. 2007, 6 pages.*

* cited by examiner

Primary Examiner — William Phillip Fletcher, III

(57) ABSTRACT

A polymer injection method and apparatus for blocking piping in dikes and dams, uses non-water reacted two-component polymeric material to produce a hydra-insensitive expanding polymer for blocking piping channel. A transferring device is provided to the method, which includes an injection gun, an injector, and a hollow tube, wherein the injection gun connects with an entrance end of the hollow tube through the injector, and an outlet end of the hollow tube inserts into the entrance of the piping channel. The two components of the polymeric material are respectively transported to the injection gun, and are mixed and injected from the gun with high pressure, through the injector, to the hollow tube, and then pushed into the piping channel. Under the chemical reaction, the mixed material expands inside the receiver and becomes foamed solid from liquid, and then the polymer receiver inflates and blocks the piping channel quickly.

13 Claims, 3 Drawing Sheets

POLYMER INJECTION METHOD FOR BLOCKING PIPING IN DIKES AND DAMS

BACKGROUND OF THE PRESENT INVENTION

1. Field of Invention

The present invention relates generally to apparatuses and methods for dam reinforcement and rehabilitation, and more particularly to a method and apparatus for stopping tunnel erosion resulting from piping in dikes and dams by injecting two-component polymeric material to form a hydra-insensitive expanding polymer block inside the piping channels.

2. Background

The safety of hydraulic infrastructures such as reservoirs is one of the top priority safety concerns. If a reservoir collapses, it could cause heavy damages to properties or even casualties. Piping, a common hazer for dams and dikes, is a progressive formation of an underground erosion tunnel between the upstream and the downstream sides in a dam. It occurs when small granules in non-cohesive soil move or are moved out by water flow through the pores of big granules under seepage. The granules move to form interstices, then the interstices gradually expand and form irregular piping channel eventually. It occurs at the seepage outlet or inside the soil. As the piping magnitude increases, the soil continuously drains and the interstice diameter gradually expands, and the interstice depth gradually extends into the dike. Once the existing interstices connect with each other, the soil will lose faster, which further causes the interstices in dike to collapse and eventually the dike may collapse as well.

The conventional treatment methods for piping are as follows:

The Loaded Filter Method. This method comprises these steps: throwing flexible materials such as plugs or fabrics into the piping channel to reduce the flow of water current; blocking the entrance of piping tunnel with bags filled with soil and rock; throwing in thick clays along the side of the dike, and at the same time setting up the surround well near the outlet of piping tunnel to guide the water flow to make sure that the current does not further damage the outlet, does not carry sand in the water, and the seepage returns back to the normal level.

The Cement-Clay Paste Grouting Method. This method uses grouting pressure to squeeze cement-clay paste into the gaps, cracks or caves and then forms in coagulation. As the cement-clay paste flows in the piping channel and as distance extends, the grouting pressure gradually reduces while the frictional resistance gradually increases. As the flow speed gradually reduces, the cement-clay paste begins to accumulate and eventually blocks up the piping channel. The rationale of this method is that the agglutinating property of cement-clay paste and the property of the sand and soil in piping tunnels are similar in their elastic modulus, therefore, the cement clay paste grout can perform the blocking.

Though widely used, the above methods have several known drawbacks and deficiencies.

Time Consuming and Labor Intensive. Once a piping spot gets noticed, the dike should be treated as an emergency and must be reinforced immediately. But the conventional methods usually take too long to be implemented.

Insufficient Treatment. Neither of the conventional methods mentioned above is able to offer an adequate solution. The loaded filter method is mainly used to block the inlet and the outlet ends of a tunnel. It is unable to reach inside the tunnel to block the entire piping channel. As such, the integrity of dike suffers, for example, another piping problem may well be likely to take place at exactly the same spot over time.

As for the cement-clay paste grouting method, it is supposed to block the entire piping channel, but in circumstances when the water current is too strong and washes away even the biggest granule in the piping channel, the granules will not be able to subside and get accumulated to perform the expected blocking. Therefore a better solution is needed.

SUMMARY OF THE PRESENT INVENTION

A main object of the present invention is to provide a polymer injection method for blocking piping in dikes and dams, which uses non-water reacted two-component polymeric material to form a hydra-insensitive expanding polymer for blocking a piping channel, such that the grouting process can be done quickly and the dike or dam can be reinforced adequately.

Another object of the present invention is to provide a polymer injection method for blocking piping in dikes and dams, wherein the hydra-insensitive expanding polymer is a waterproof material, which has good durability and toughness.

Another object of the present invention is to provide a polymer injection method for blocking piping in dikes and dams, wherein the density or strength of the hydra-insensitive expanding polymer can be adjusted to meet the different soil characteristic.

Another object of the present invention is to provide a polymer injection method for blocking piping in dikes and dams, wherein the density of the hydra-insensitive expanding polymer is generally less than 10% of the density of the cement paste, such that the hydra-insensitive expanding polymer does not increase a large amount of load to the foundation of the dike or dam.

Another object of the present invention is to provide a polymer injection method for blocking piping in dikes and dams, wherein no expensive and complicated equipment is employed in the present invention in order to achieve the above mentioned objects. Therefore, the present invention successfully provides the polymer injection method for blocking piping in dikes and dams.

Accordingly, in order to accomplish the above objects, the present invention provides a polymer injection method for blocking piping in dikes and dams. The method features the use of a non-water reacted two-component polymer composition and a bag-like container to receive the expanding materials resulted from the polymer chemical reactions. At the event when a piping channel is already happening and its water flows in a relatively high rate, the present invention is able to provide a faster blocking method and treatment. A possible embodiment of the invention is to insert the container or receiver into the entrance of the piping tunnel, and then inject the mixed polymeric materials into the receiver in which the materials expand due to chemical reactions. As a result it inflates the receiver bag and blocks the piping channel quickly.

The polymer injection method for blocking piping in dikes and dams, comprising the steps of:

(a) providing a transferring device comprising an injection gun, an injector, and a hollow tube, wherein the injection gun connects with an entrance end of the hollow tube through the injector;

(b) inserting an outlet end of the hollow tube into the entrance of a piping channel;

(c) transporting two components of polymeric material to the injection gun respectively;

(d) mixing and injecting the polymeric material from the injection gun with high pressure, through the injector, into the entrance end of the hollow tube, wherein the mixed material starts a chemical reaction; and (e) pushing the mixed and reacted material to enter the entrance of the piping channel from the outlet end of the hollow tube, wherein the mixed and reacted material expands and becomes foamed solid from liquid.

These and other objectives, features, and advantages of the present invention will become apparent from the following detailed description, the accompanying drawings, and the appended claims.

DETAILED DESCRIPTION OF THE PREFERRED EMBODIMENT

Figure 1:
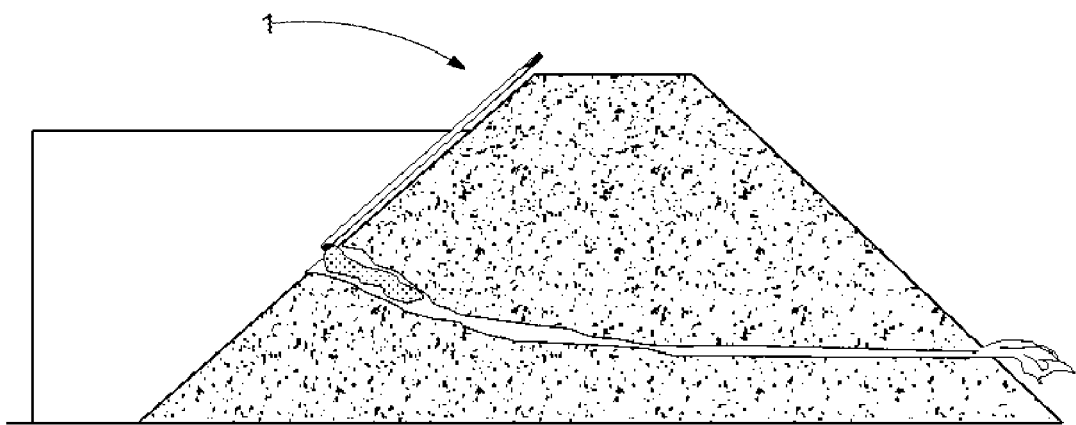
FIG. 1 is a perspective view of a dike or dam with a transferring device before injecting the mixed polymeric material according to a preferred embodiment of the present invention.
Figure 2:
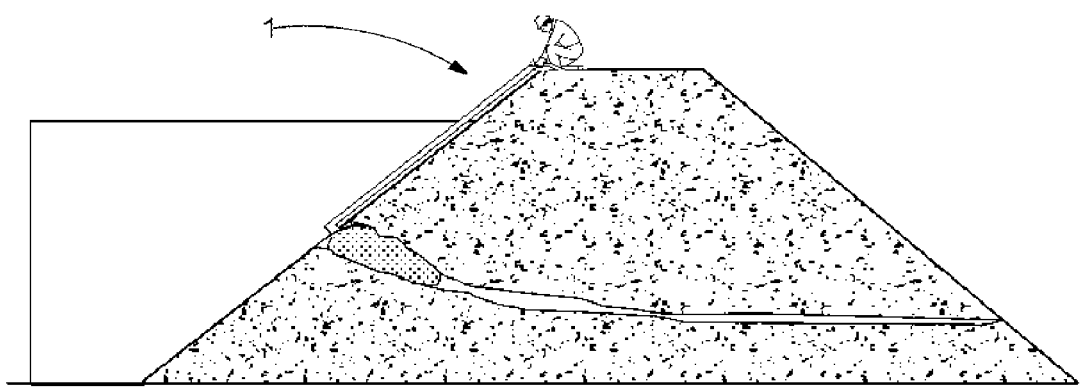
FIG. 2 is a perspective view of the dike or dam with the transferring device after injecting the mixed polymeric material according to the above preferred embodiment of the present invention.

Referring to FIG. 1 and FIG. 2 of the drawings, a polymer injection method for blocking piping in dikes and dams according to a preferred embodiment of the present invention is illustrated, which uses non-water reacted two-component polymeric material to form a hydra-insensitive expanding polymer for blocking the piping channel in a dike or dam, wherein the piping channel is formed by the piping effect and traverses the dike from one side to another side. FIG. 1 is a perspective view of a dike or dam with a transferring device 1 before injecting the mixed polymeric material, and FIG. 2 is a perspective view of the dike or dam with the transferring device 1 after injecting the mixed polymeric material.

Figure 3:
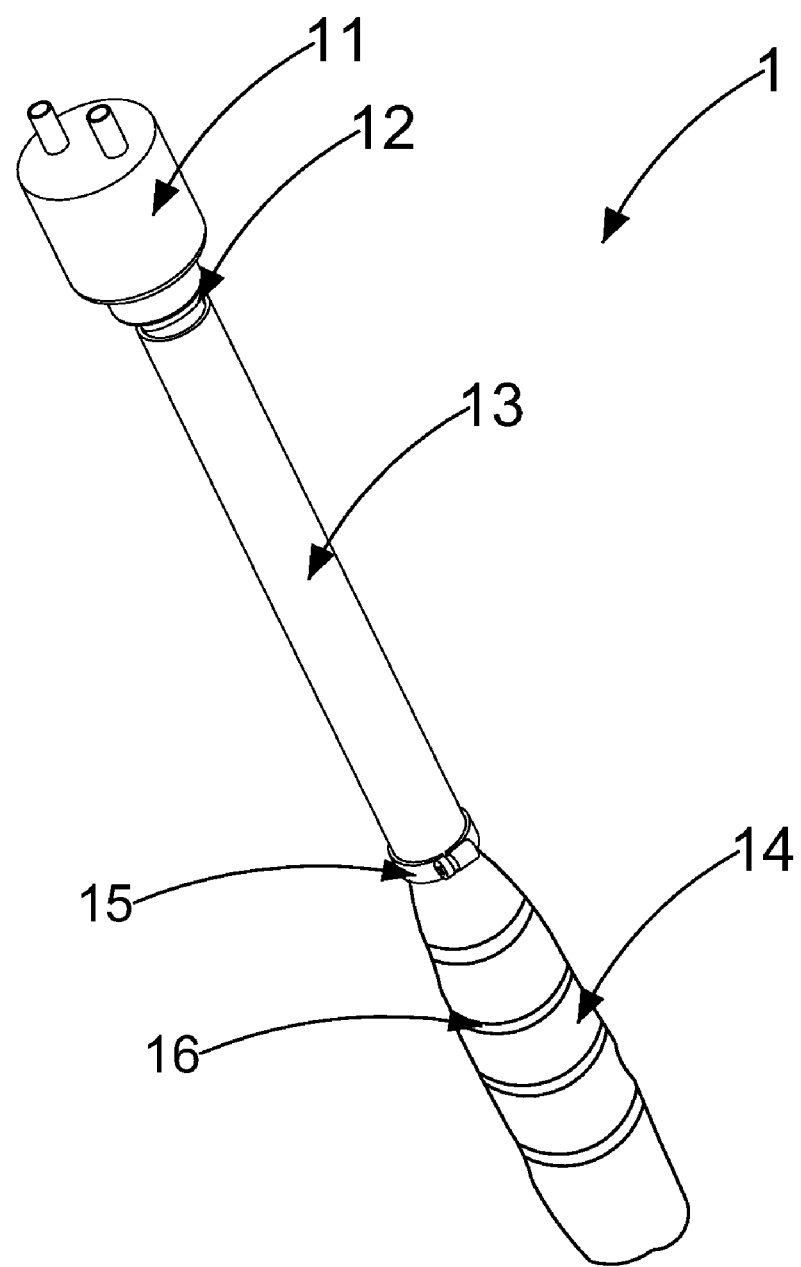
FIG. 3 is a perspective view of the transferring device according to the above preferred embodiment of the present invention.
Figure 4:
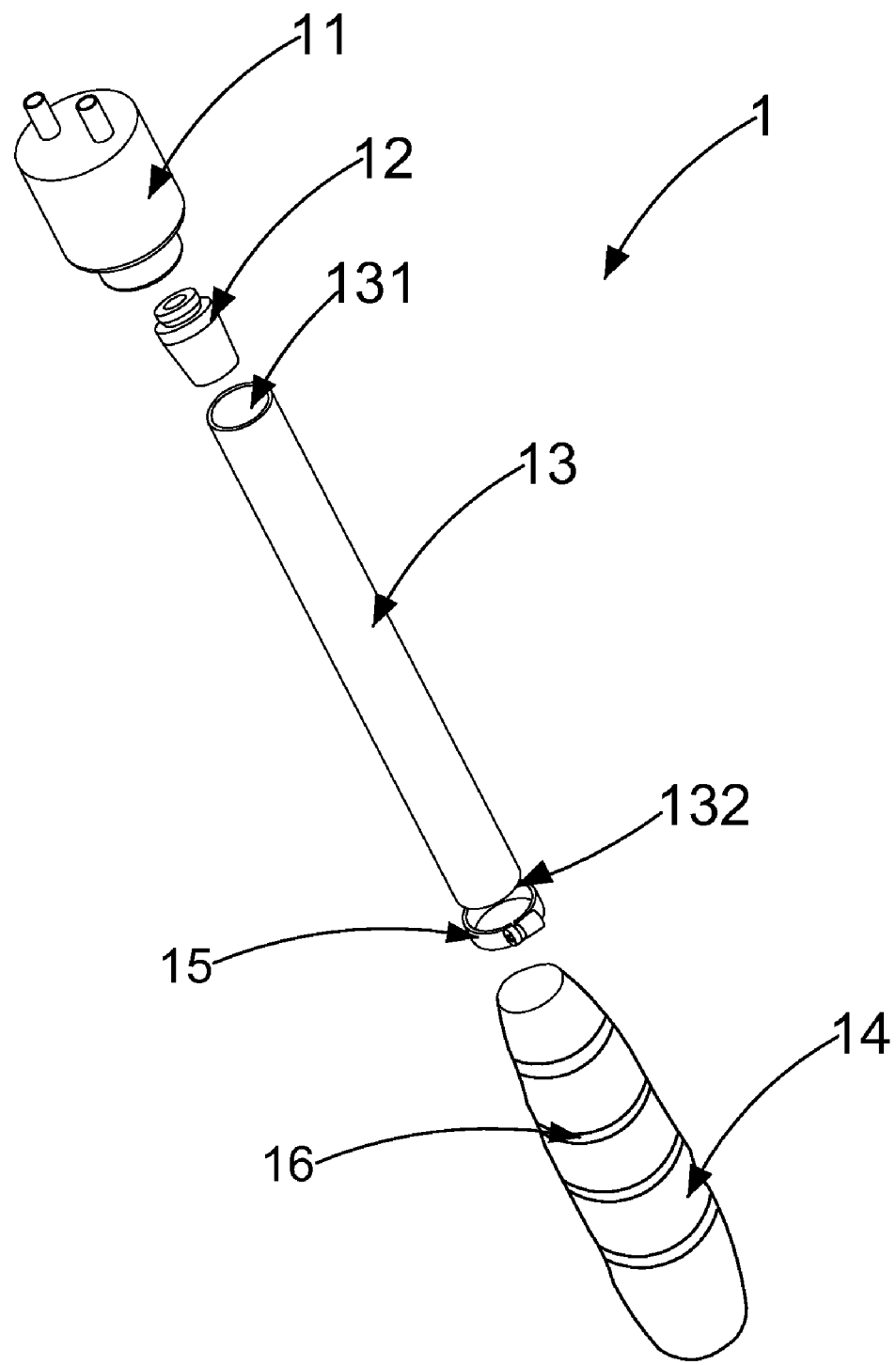
FIG. 4 is an exploded view of the transferring device according to the above preferred embodiment of the present invention.

As shown in FIG. 3 and FIG. 4, the transferring device 1 is provided to the polymer injection method for blocking piping in dikes and dams, which comprises an injection gun 11, an injector 12 and a hollow tube 13, wherein the injection gun connects with an entrance end 131 of the hollow tube 13 through the injector 12, an outlet end 132 of the hollow tube 13 inserts into the entrance of the piping channel. The entrance of the piping channel is usually on the upstream side of the dike or dam which faces the waterhead. It is worth to mention that the outlet end 132 of the hollow tube 13 can be made to a curving shape or a discretionary shape in order to insert into the entrance of the piping channel.

The two components of polymeric material are respectively transported to the injection gun 11. When they are mixed and injected with a high pressure from the injection gun 11, through the injector 12, into the hollow tube 13, the two components of the polymeric composition start the chemical reaction, and the mixed material keeps flowing from the entrance end 131 to the outlet end 132. After the mixed material enters the entrance of the piping channel in the dike or dam, it expands and becomes foamed solid from liquid. Finally, the piping channel is blocked by the hydra-insensitive expanding polymer.

It is worth to mention that although the chemical reaction of the two-components begins after they are injected from the injection gun 11, because the mixed material flows with a high speed under the high pressure in the tube, it will not become solid and will not block the tube until the injecting process ends.

Generally, the mixed material will finish the expanding in 40-50 seconds, and will achieve more than 90% of its full strength in about 15 minutes, such that the present process of polymer injection to block the piping channel is much quicker compared with the conventional methods.

When the mixture of the two components finishes the chemical reaction and becomes the hydra-insensitive foam polymer, the mixture volume will expand more than twenty times in free rise condition, and then the hydra-insensitive expanding polymer overflows the piping channel. Besides, the hydra-insensitive expanding polymer is a waterproof material, and has high durability and toughness, such that the dike or dam can be reinforced adequately.

The transferring device 1 further comprises a polymer receiver 14 to confine the hydra-insensitive expanding polymer, wherein the polymer receiver 14 connects with the outlet end 132 of the hollow tube 13, and then the mixed material enters the polymer receiver 14 from the hollow tube 13, and finishes the chemical reaction in the polymer receiver 14. Such that the hydra-insensitive expanding polymer is held in the polymer receiver 14 as a whole body, and the water flow can not wash away the hydra-insensitive expanding polymer.

As a preferred embodiment, the polymer receiver 14 is made of flexible material, so the polymer receiver 14 can be used to different size of the piping channel. As an alternative embodiment, the polymer receiver 14 can be made with a geotextile bag because the geotextile bags are widely available and relatively inexpensive.

According to the preferred embodiment of the present invention, the hollow tube 13 uses a malleable iron pipe, because the malleable iron pipe has different size and is easy to adjust length for matching different condition.

The transferring device 1 further comprises a hoop 15 which is used to connect the hollow tube 13 with the polymer receiver 14. The hoop 15 can be use for the different size hollow tube 13.

The transferring device 1 further comprises at least a fetter 16 to tie the polymer receiver 14. The polymer receiver 14 is tied by the fetter 16 as a banding, so the polymer receiver 14 is easy to enter the piping channel. The fetter 16 always uses adhesive tape or string, so when the mixed polymer material expands and the receiver 13 inflates, the fetter 16 will break easily.

As mentioned above, the polymer injection method for blocking piping in dikes and dams, comprising the steps of:

(a) providing the transferring device 1 comprising the injection gun 11, the injector 12, and the hollow tube 13, wherein the injection gun 11 connects with the entrance end 131 of the hollow tube 13 through the injector 12;

(b) inserting the outlet end 132 of the hollow tube 13 into the entrance of a piping channel;

(c) transporting two components of polymeric material to the injection gun 11 respectively;

(d) mixing and injecting the polymeric material from the injection gun 11 with high pressure, through the injector 12, into the entrance end 131 of the hollow tube 13, wherein the mixed material starts a chemical reaction; and (e) pushing the mixed and reacted material to enter the entrance of the piping channel from the outlet end 132 of the hollow tube 13, wherein the mixed and reacted material expands and becomes foamed solid from liquid.

It is worth to mention that the density or intensity of the hydra-insensitive expanding polymer can be adjusted to meet the different soil characteristic through adjusting the amount of the material to be injected. The density of the hydra-insensitive expanding polymer is less than 10% the density of the cement paste, so even if the piping channel is integrally filled with the hydra-insensitive expanding polymer, the hydra-insensitive expanding polymer does not increase a large amount of load to the foundation of the dike or dam.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and they are subject to change without departure from such principles. Therefore, this invention includes all modifications encompassed within the spirit and scope of the following claims.

What is claimed is:

1. A polymer injection method for blocking piping in dikes and dams, comprising the steps of:
   (a) providing a transferring device comprising an injection gun, an injector, and a hollow tube, wherein said injection gun connects with an entrance end of said hollow tube through said injector;
   (b) inserting an outlet end of said hollow tube into an entrance of a piping channel of a dike or dam;
   (c) transporting two components of polymeric material to said injection gun respectively;
   (d) mixing and injecting the polymeric material from said injection gun with pressure, through said injector, into said entrance end of said hollow tube, wherein the mixed material starts a chemical reaction; and
   (e) pushing the mixed and reacted material to enter said entrance of said piping channel of said dike or dam from said outlet end of said hollow tube, wherein the mixed and reacted material expands and becomes foamed solid from liquid to block said pipe channel of said dike or dam.

2. The polymer injection method, as recited in claim 1, wherein said transferring device further comprises a polymer receiver to confine hydra-insensitive expanding polymer, wherein said polymer receiver connects with said outlet end of said hollow tube.

3. The polymer injection method, as recited in claim 2, wherein said transferring device further comprises a hoop which is used to connect said hollow tube with said polymer receiver.

4. The polymer injection method, as recited in claim 2, wherein said transferring device further comprises at least one fetter to tie said polymer receiver, wherein said polymer receiver is tied by said fetter as a banding.

5. The polymer injection method, as recited in claim 3, wherein said transferring device further comprises at least one fetter to tie said polymer receiver, wherein said polymer receiver is tied by said fetter as a banding.

6. The polymer injection method, as recited in claim 2, wherein said polymer receiver is made with a geotextile bag.

7. The polymer injection method, as recited in claim 3, wherein said polymer receiver is made with a geotextile bag.

8. The polymer injection method, as recited in claim 4, wherein said polymer receiver is made with a geotextile bag.

9. The polymer injection method, as recited in claim 5, wherein said polymer receiver is made with a geotextile bag.

10. The polymer injection method, as recited in claim 4, wherein said fetter is an adhesive tape or a string.

11. The polymer injection method, as recited in claim 5, wherein said fetter is an adhesive tape or a string.

12. The polymer injection method, as recited in claim 8, wherein said fetter is an adhesive tape or a string.

13. The polymer injection method, as recited in claim 9, wherein said fetter is an adhesive tape or a string.

* * * * *